United States Patent [19]
Gabriel et al.

[11] 3,979,970
[45] Sept. 14, 1976

[54] APPARATUS CAPABLE OF BEING AUTOMATICALLY UNCOUPLED FOR THE MANUAL OPERATION OF A ROTARY SHAFT, IN PARTICULAR A VALVE ACTUATING SHAFT

[75] Inventors: Michel Gabriel, Pont-a-Mousson; Claude Maeder, Nancy, both of France

[73] Assignee: Pont-A-Mousson S.A., Nancy, France

[22] Filed: June 11, 1975

[21] Appl. No.: 585,892

[30] Foreign Application Priority Data
July 4, 1974  France .............................. 74.23248

[52] U.S. Cl. .................................. 74/625; 251/130
[51] Int. Cl.² ........................................ F16H 35/00
[58] Field of Search ............... 74/355, 625; 251/130

[56] References Cited
UNITED STATES PATENTS

| | | | |
|---|---|---|---|
| 2,933,937 | 4/1960 | Kron et al. ..................... | 251/130 X |
| 3,217,604 | 11/1965 | Knox ............................. | 74/625 X |

Primary Examiner—Edgar W. Geoghegan
Attorney, Agent, or Firm—Sughrue, Rothwell, Mion, Zinn and Macpeak

[57] ABSTRACT

The shaft to be operated is connected to a gear and is operable by an electrical device. This apparatus comprises a handwheel provided with a gear and integral with a rod movable between a coupling position in which the two gears are engaged and an uncoupling position to which it is elastically biased. A first pivotal arm has an end connected to move with the rod. A second pivotal arm is movable between a first and second position for locking the first arm in positions correspondingly respectivey to the uncoupled and coupled states of the apparatus. A system controlled by the electrical device shifts the second arm to its first and second position when the electrical device is put in action and out of action respectively.

7 Claims, 3 Drawing Figures

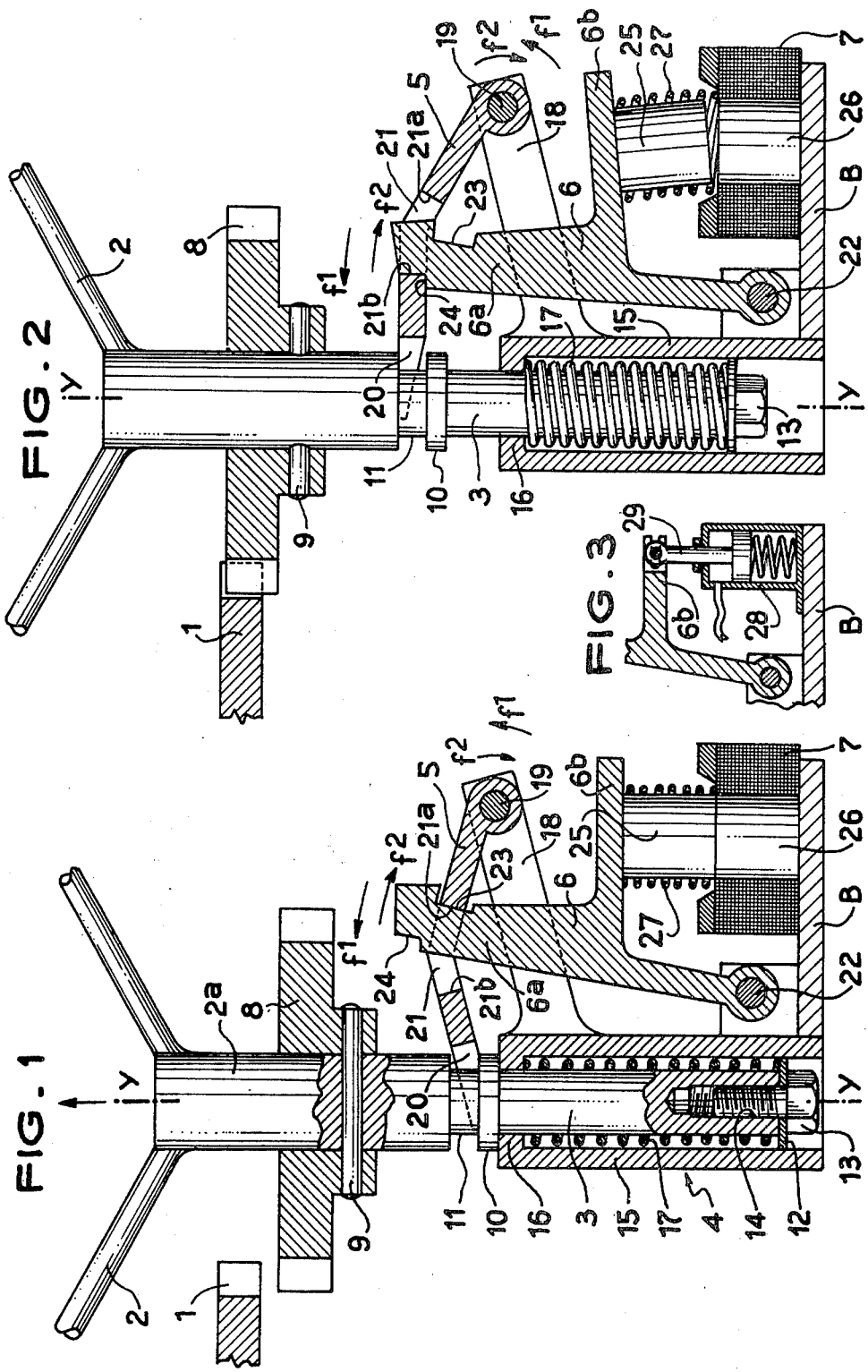

APPARATUS CAPABLE OF BEING AUTOMATICALLY UNCOUPLED FOR THE MANUAL OPERATION OF A ROTARY SHAFT, IN PARTICULAR A VALVE ACTUATING SHAFT

The present invention relates to apparatus capable of being automatically uncoupled for manually operating a rotary shaft, and in particular a valve actuating shaft, which is also capable of being operated electrically, pneumatically or hydraulically.

It is known, in particular in the actuation of valves, to provide in addition to an electric, pneumatic or hydraulic device for operating the shaft actuating the valve, an apparatus capable of being automatically uncoupled for the manual operation of this shaft. Such an apparatus is adapted to permit the manual operation of the actuating shaft when, and only when, the electric, pneumatic or hydraulic device is out of operation. Known apparatus of this type are generally complicated and relatively expensive.

An object of the invention is to provide an apparatus of this type which is simple, strongly built and cheap.

According to the invention, there is provided an apparatus capable of being automatically uncoupled for manually operating a rotary shaft, in particular a valve actuating shaft, which is connected to rotate with a gear and is also operable by an electric, pneumatic or hydraulic operating device, said apparatus comprising an operating handwheel provided with a second gear and integral with a rod axially movable between a position for coupling the apparatus, in which the two gears interengage, and a position for uncoupling the apparatus to which uncoupling position the rod is biased by elastically yieldable return means, a first pivotal arm having an end connected to move in translation with the rod, a second pivotal arm movable between a first position and second position for locking the first pivotal arm in positions corresponding respectively to the uncoupled state and coupled state of the apparatus, and means controlled by said operating device and urging the second pivotal arm to its first position and second position when the operating device is put in action and out of action respectively.

Preferably, the second arm is movable in the general plane of the first arm and comprises one end which is engaged in a slot of the first arm and is provided on one side with a recess constituting a hook adapted to cooperate with an edge of said slot in the first position of the second arm so as to lock the first arm in its position corresponding to the uncoupled state of the apparatus.

In this case it is advantageous that the other side of said end of the second arm have a shoulder adapted to cooperate with the opposite edge of said slot in the second position of the second arm so as to maintain the first arm, in opposition to the elastically yieldable rod return means, in its position corresponding to the coupled state of the apparatus.

Further features and advantages of the invention will be apparent from the ensuing description with reference to the accompanying drawing, given solely by way of example and in which:

FIG. 1 is a partial sectional view of an apparatus according to the invention in the uncoupled state;

FIG. 2 is a view similar to FIG. 1 of this apparatus in the coupled state, and

FIG. 3 is a sectional view, to a reduced scale, of a part of a modification of the apparatus.

The apparatus shown in FIGS. 1 and 2 is applied to the manual control of the rotation of a gear 1 integral with a rotary shaft, for example a valve actuating shaft which is also actuated by an electric motor (not shown).

This apparatus comprises a manual control handwheel 2 integral through its cylindrical hub $2^a$ with one end of a cylindrical rod 3 whose axis Y—Y is parallel to the axis of the gear 1 and of the rotary shaft to be rotated. The apparatus also comprises a fixed part, generally designated by the reference number 4, which is fixed to a support B, two movable arms 5 and 6 and an electromagnet 7 secured to the support B.

For convenience of description, it will be assumed that the axis Y—Y is vertical and that the handwheel 2 is fixed at the upper end of the rod 3, but it will be understood from the ensuing description that any other orientation of this axis Y—Y and gear 1 may be envisaged.

A gear 8 adapted to mesh with the gear 1 is rendered integral with the handwheel 2 by a transverse pin 9. An annular flange 10, of the same diameter as the hub $2^a$ of the handwheel 2, is secured to the upper part of the rod 3 and defines with the lower end of the hub $2^a$ a square-sectioned recess 11. A washer 12 is secured by a screw 13 to the lower end of the rod 3 in which end there is formed a blind tapped aperture 14.

The fixed part 4 of the apparatus comprises mainly a hollow cylinder 15 having an axis Y—Y in which the rod 3 is slidable. An inner flange 16 is provided at the upper end of the cylinder 15 limits the downward movement of the rod 3 by the abutment of the lower surface of the flange 10 against the upper surface of the flange 16. A compression coil spring 17 is interposed between the washer 12 and the lower surface of the flange 16. This spring 17 therefore permanently biases the rod 3 downwardly. A fixed arm 18 extends laterally from the outer surface of the cylinder 16.

A first movable arm 5 is mounted to pivot about a horizontal pin 19 secured to the free end of the arm 18. It has the shape of a very open inverted V having a roughly horizontal general direction. The end of the arm 5 opposed to the pivotal connection 19 has the shape of a fork having two branches 20, these two branches having their lower surface beveled and being engaged in the recess 11 of the rod 3. The elbow of the arm 5 is provided with a longitudinal elongated opening or slot 21.

The second movable arm 6 is located in the general plane of the first arm and mounted at one end to pivot about a horizontal pin 22 which is parallel to the pivot pin 19 of the first movable arm and carried by the support B in the vicinity of the cylinder 15. This arm 6 is divided roughly in the middle thereof into two branches $6^a$ and $6^b$ which are roughly perpendicular to each other. The branch $6^a$ extends in a roughly vertical direction through the opening 21 in the arm 5 and is provided near its free end with a recess 23 having a square section which gives to this end the shape of a hook facing the pin 19. The free end of the branch $6^a$ is also provided, on the side thereof opposed to the recess 23, with a shoulder 24.

Secured under the second branch $6^b$ of the arm 6 is a cylindrical member 25 forming a magnetic core and disposed roughly above a cylindrical magnetic core 26 of the same diameter of the electromagnet 7. A compression coil spring 27 is mounted around the magnetic core 25 and bears against the lower surface of the branch 6$^b$ and against the upper surface of the electromagnet 7. The spring 27 therefore tends to urge the two magnetic cores 25 and 26 away from each other and consequently to swing the arm 6 in the direction of arrow f$^1$.

The electric motor for driving the gear 1 in rotation and the electromagnet 7 are so connected that when the motor is supplied with current the electromagnet 7 is energized, whereas when the supply of current to the motor is cut off the electromagnet 7 is non-energized.

The apparatus just described operates in the following manner:

It will be assumed that the motor is supplied with current (FIG. 1). The core 25 is attracted against the core 26 of the electromagnet 7 which is energized. The hook 23 of the arm 6 is engaged with one edge 21a of the opening 21 of the arm 5 and locks the arm 5 in the lower position, the beveled surface of the forked branches 20 of the arm 5 cooperating with the upper surface of the flange 10 of the rod 3. Under the action of the spring 17, the rod 3 is in the lower position, the flange 10 bearing against the flange 16 of the cylinder 15. In this uncoupled position, the gear 8 of the handwheel 2 is located below the level of the gear 1 and is not meshed with the latter.

It will be easily understood that, so long as the motor is supplied with current and consequently the electromagnet 7 is energized, the hooking of the recess 23 of the arm 6 on the edge 21a of the opening 21 of the arm 5 prevents any upward movement of the arm 5 and of the rod 3 and consequently precludes any upward movement for coupling that might be produced by the exertion of a force on the handwheel 2 by an operator who had not noticed that the gear 1 is already driven by the electric motor.

When the supply of current to the electric motor is cut off, the electromagnet 7 is no longer energized and no longer attracts the core 25. Under the effect of the spring 27 which is compressed between the branch 6b of the arm 6 and the electromagnet 7, the arm 6 is urged back and pivots about the pivot pin 22 (arrow f1) until the side of the branch 6a of the arm 6 opposed to the hook 23 bears against the edge 21b of the opening 21 opposed to the edge 21a which had been engaged with the hook 23. The arm 5 is thus released from the locking action which the arm 6 exerted in the lower position of the arm 5.

If the handwheel 2 is now urged upwardly, the gear 8 and the rod 3 are moved therewith in opposition to the force exerted by the spring 17. This movement also causes the arm 5 to pivot upwardly (direction of arrow f$^2$) about its pivot pin 19, the forked branches 20 of the arm 5 remaining in the recess 11 in the rod 3.

When the gear 8 engages the gear 1 to be shifted (FIG. 2), owing to the permanent biasing of the arm 6 in the direction of arrow f1 under the action of the spring 27, the edge 21b of the opening 21, which constantly bears against the branch 6a of the arm 6, engages in the shoulder 24 of the branch 6a. This engaging precludes any reverse pivoting (in the direction of arrow f$^1$) of the arm 5 so that the shaft 3 is maintained in the upper position, in opposition to the force exerted by the spring 17, by the bearing of the lower end of the hub 2a of the handwheel 2 against the unbeveled surface of the forked branches 20. The apparatus is now locked in the position for manual control.

When the motor is once again supplied with current, the electromagnet 7 is once again energized and this attracts the core 25 against the core 26 and pivots the arm 6, in opposition to the action of the spring 27, in the direction of arrow f$^2$. This pivoting movement removes the support for the arm 5 constituted by the shoulder 24 and, under the action of the spring 17, the rod 3 resumes its initial position shown in FIG. 1 and causes the arm 5 to rotate in the direction of arrow f$^1$. The hook 23 then engages the edge 21a of the opening 21 of the arm 5 and the whole of the apparatus is once more locked in the uncoupled position shown in FIG. 1.

The apparatus capable of being uncoupled for the manual control of a shaft described hereinbefore is very simple and therefore cheap and it ensures high safety in use. It moreover permits, if desired, obtaining a gearing down in the drive between the gear 1 and the handwheel 2. For this it is sufficient to arrange that the gear 8 have a diameter less than the gear 1.

It has been assumed in the foregoing description that the rotation of the gear 1 was achieved by means of an electric motor. However, it is possible to employ such an apparatus when this gear 1 is driven by a pneumatic or hydraulic device. In this case, it is possible by way of a modification as shown in FIG. 3, to replace the electromagnet 7 and the magnetic cores 25 and 26 by a device comprising a jack 28 whose piston rod 29 is connected to the arm 6b. A combination of an electric motor for driving the gear in rotation and a jack for actuating the arm 6, or a device for magnetically driving or hydraulically driving the gear 1 and an electromagnet 7, may be also envisaged.

By way of a modification, it is possible to envisage giving the whole of the apparatus any desired orientation with respect to the direction of the shaft to be controlled for reasons of size or convenience, by replacing the spur gear 8 by a bevel gear.

The manual control apparatus capable of being uncoupled according to the invention may therefore be employed for any releasable manual control for driving a shaft or a gear in rotation irrespective of the type of the other device for driving the shaft or gear. It can in particular be employed in any valve actuating device.

Having now described our invention what we claim as new and desire to secure by Letters Patent is:

1. An apparatus capable of being automatically uncoupled for manually operating a rotary shaft, in particular a valve actuating shaft, which is connected to rotate with a first gear and is also operable by an electric, pneumatic or hydraulic drive device, said apparatus comprising a support, a rod mounted in the support, an operating handwheel and a second gear connected to rotate with the rod, the rod being axially movable relative to the support between a first position for coupling the apparatus in which the two gears interengage, and a second position for uncoupling the apparatus in which the two gears are disengaged from each other, elastically yieldable return means for biasing the rod to the second position, a first arm pivotably mounted relative to the support and having an end connected to move in translation with the rod as the arm pivots, a second arm pivotably mounted relative to the support and pivotable between a first position and a second position and combined with the first arm for locking the first arm respectively in the second position and first position of the first arm, and means responsive to said drive device and combined with the second arm for moving the second arm to its first position and second position when said drive device is put in action and out of action respectively.

2. An apparatus as claimed in claim 1, comprising means defining a recess integral with the rod, the end of the first arm which is connected to move in translation with the rod having the shape of a fork and being engaged in the recess.

3. An apparatus as claimed in claim 2, wherein the means defining the recess comprise a hub on the handwheel and a flange on the rod axially spaced from the hub, the flange being capable of limiting the movement of the rod to its second position.

4. An apparatus as claimed in claim 1, wherein the first arm has a slot defining an edge and the second arm is movable in the general plane of the first arm and has an end portion which is engaged in the slot in the first arm, the end position having, on one side, a recess defining a hook adapted to cooperate with said edge of the slot in the first position of the second arm to lock the first arm in its second position.

5. An apparatus as claimed in claim 4, wherein the slot has a second edge opposed to said edge and the end portion of the second arm has on a side opposed to said one side a shoulder adapted to cooperate with the second edge of the slot in the second position of the second arm to maintain the first arm in its first position in opposition to the action of the elastically yieldable return means.

6. An apparatus as claimed in claim 1, wherein said responsive means for moving the second arm comprise an electromagnet and opposing elastically yieldable means.

7. An apparatus as claimed in claim 1, wherein said responsive means for moving the second arm comprise a jack.

* * * * *